No. 673,982. Patented May 14, 1901.
H. HAMET.
METHOD OF MANUFACTURING INDIA RUBBER GOODS.
(Application filed May 24, 1900.)
(No Model.) 2 Sheets—Sheet 2.
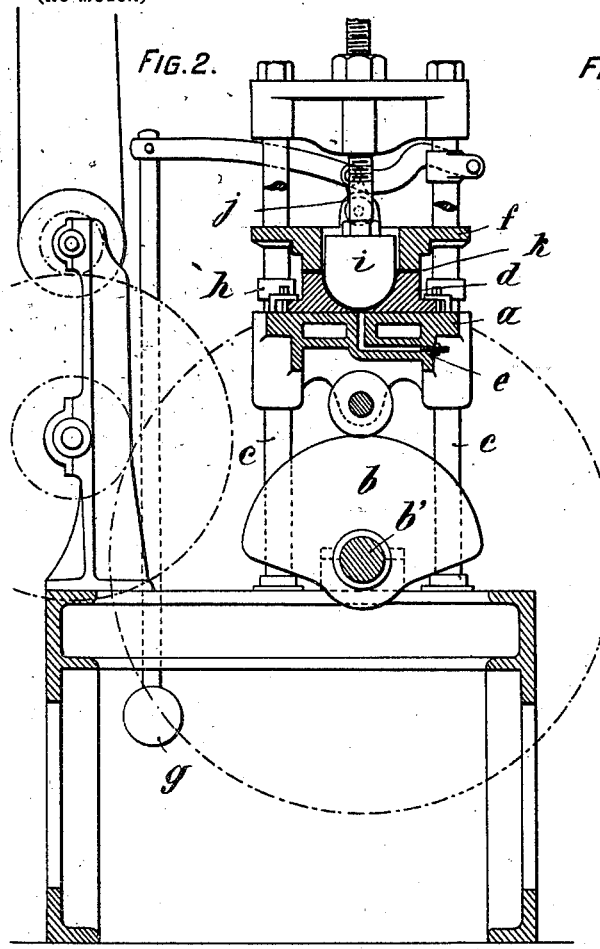
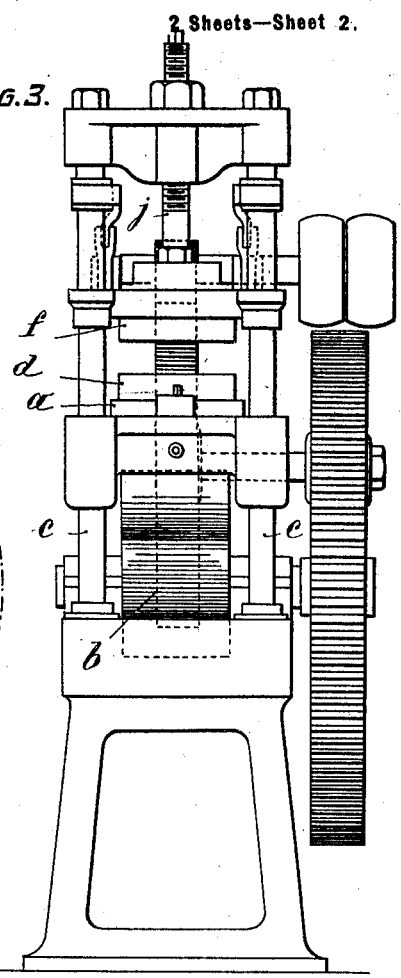
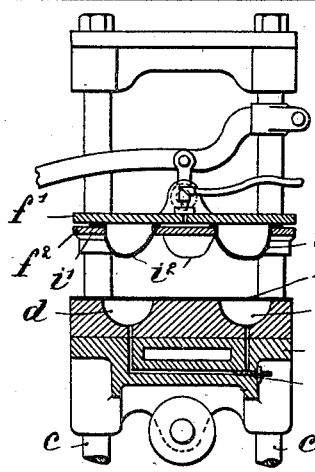
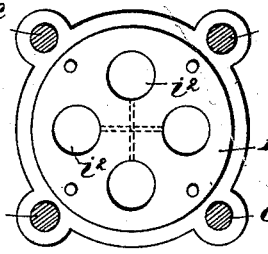
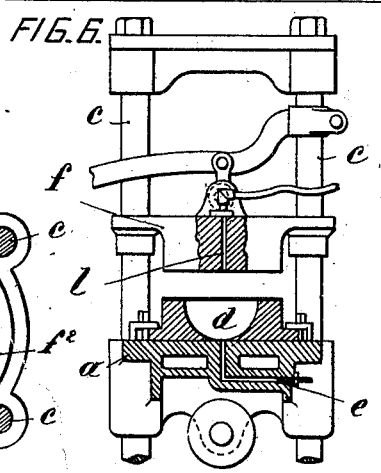

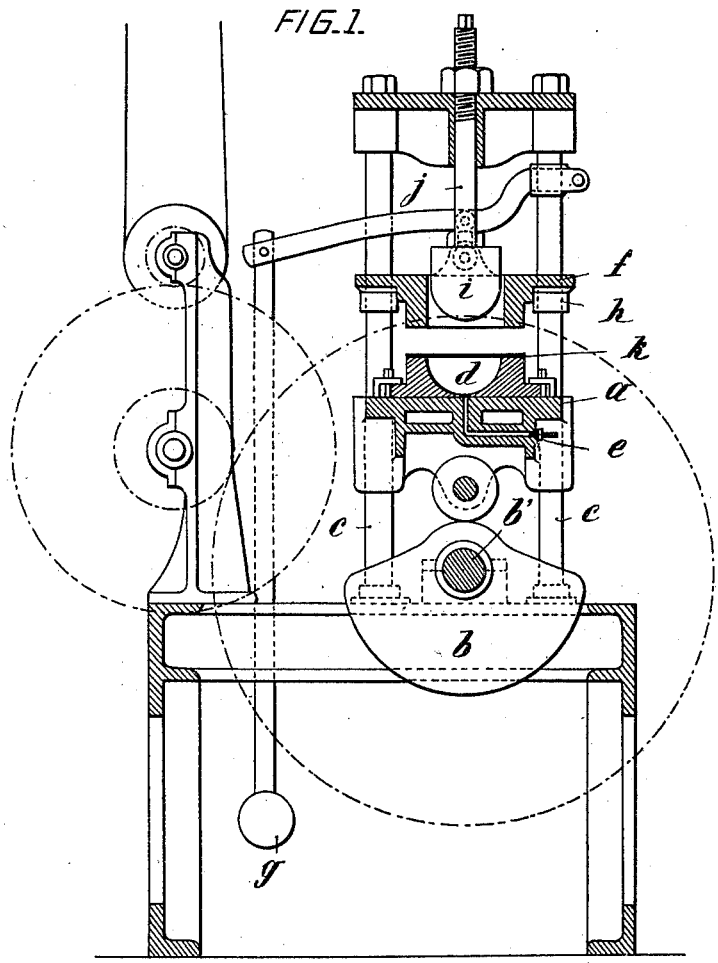

UNITED STATES PATENT OFFICE.

HENRI HAMET, OF PARIS, FRANCE.

METHOD OF MANUFACTURING INDIA-RUBBER GOODS.

SPECIFICATION forming part of Letters Patent No. 673,982, dated May 14, 1901.

Application filed May 24, 1900. Serial No. 17,815. (No specimens.)

*To all whom it may concern:*

Be it known that I, HENRI HAMET, engineer, of 34 Rue Piat, in the city of Paris, Republic of France, have invented Improvements in Methods of Manufacturing India-Rubber Goods, of which the following is a full, clear, and exact description.

This invention relates to the manufacture of rubber goods by pressing or molding in dies previous to vulcanization.

The invention consists, essentially, in a method whereby the sheet of caoutchouc is pressed against the sides of the mold by the combined action of a vacuum and of mechanical or fluid pressure. According to this method the unvulcanized sheet of caoutchouc having been fixed upon the mold a vacuum is produced within the mold beneath the sheet of caoutchouc, which is caused by atmospheric pressure to assume somewhat the shape of the mold, after which strong pressure is applied, so as to force the sheet to conform exactly to the configuration of the mold. This pressure may be applied, according to the kind of article to be made, either by means of a solid male die formed of corresponding form to the article to be made or by means of an elastic bag capable of being expanded by a fluid under pressure or directly by the pressure of a fluid—such as by compressed air, for example.

In order to increase the plasticity of the rubber, the mold may be heated during the operation.

To facilitate the removal of the molded article from the mold, compressed air or other fluid under pressure may be forced between the mold and the molded article.

By this method all kinds of rubber goods, whether solid or hollow, may be cheaply made, the articles produced being always of exactly the same dimensions, and therefore accurately fitting the curing or vulcanizing molds.

Reference is to be had to the accompanying drawings, wherein Figures 1 and 2 are vertical sections of the machine at the beginning and end of the operation, respectively. Fig. 3 is an end view of the machine. Figs. 4 and 5 are a vertical section and under side plan showing the die or plunger as formed by an elastic pocket. Fig. 6 shows another modification in which the fluid-pressure is applied directly to the rubber.

The same letters of reference denote like parts in all the figures.

Referring to Figs. 1, 2, and 3, the apparatus comprises a table $a$, movable in guides $c$ by a cam $b$. The table $a$, upon which the mold $d$ is fixed, is made hollow to receive steam for heating the mold $d$ during the operation. Through the table $a$ leads a channel $e$, communicating with the interior of the mold $d$ for putting the latter into communication with a vacuum-pump or other means of producing a vacuum, the said channel also serving for the introduction of compressed air into the mold for the purpose of detaching the molded article. The channel $e$ may communicate with the interior of the mold through several orifices, preferably situated at the deepest cavities of the mold. When the table $a$ rises, the upper edge of the mold $d$ meets a clamping-plate $f$, which is free to slide upon the guides $c$ and is pressed downward by a lever and weight $g$ to an extent limited by stops $h$. The clamping-plate $f$ has an aperture for the passage of the plunger or male die $i$, which is carried by a rod $j$, fixed to the head of the frame. The mold $d$ and die $i$ may be of any form required for the article to be produced, and that any number of molds $d$ and dies $i$ may be employed in the same machine. The cam-shaft $b'$ is driven through a train of reducing-gear, the operation of the machine being as follows: The table $a$ being at the bottom of its course, the sheet of unvulcanized caoutchouc $k$ is laid upon the mold $d$, as in Fig. 1, so that when by the ascent of the table $a$ the mold $d$ meets and raises the clamping-plate $f$ the margin of the sheet will be tightly clamped on all sides between the upper edges of the mold $d$ and the plate $f$. The connection between the interior of the mold $d$ and vacuum apparatus is then opened, whereupon the sheet of caoutchouc will be forced by the atmospheric pressure into the hollow of the mold, the continued upward movement of the table $a$ causing the sheet $k$ to be forcibly pressed against and receive the exact form of the walls of the mold $d$ by the die $i$, as in Fig. 2, the table $a$ remaining at its highest position for a sufficient time to enable the rubber to take the shape of the mold, which may be steam-heated, as before mentioned, to increase the plasticity of the rubber. The cam $b$ continuing to rotate then allows the table $a$ to descend, the plate $f$ being arrested by the stops $h$, while the table descends to its initial position, as shown in Fig. 1. The form of cam $b$ is such as to allow the table $a$ to remain in its lowest position long enough to permit of removing the molded article (which is facilitated by the admission of compressed air through the channel $e$) and placing a fresh sheet of caoutchouc in position. The cock controlling the admission of steam to table $a$, as well as that for putting channel $e$ in communication with the vacuum-pump or the reservoir of compressed air, as the case may be, may either be operated by hand or automatically by a suitable arrangement of cams and levers.

Instead of a solid plunger it may be an elastic bag expanded by compressed air or other fluid-pressure at the proper moment. Such a construction is shown in Figs. 4 and 5, the expansible plunger or plungers being formed by pockets $i^2$, forming part of a sheet $i'$, which is clamped between two plates $f'$ $f^2$, the pockets $i^2$ passing through holes in the under plate $f^2$, which also forms the plate for clamping the work upon the lower die, the upper plate $f'$ being pressed upon by a weighted lever and provided with a pipe connected under the control of a cock with the source of fluid-pressure and with small channels leading to the pockets, of which there may be one, two, or more. The operation is the same as before—that is to say, when table $a$ rises the sheet to be molded is clamped between the edges of the mold or molds $d$ and the plunger-plate $f'$ $f^2$, which is raised. A vacuum is then formed within the molds $d$ and compressed air is admitted to the pockets $i^2$, which on being inflated press the sheet of caoutchouc against the walls of the mold.

Fig. 6 shows the construction when the fluid-pressure is applied directly without the use of expanding pockets. In this case the plate $f$ entirely covers the mold $d$ and has a channel $l$ for the fluid under pressure leading directly onto the sheet to be molded, the operation being the same as before. The molded pieces would be afterward united, if required to form a complete article, and then vulcanized and inflated in the case of hollow articles in any suitable manner.

All kinds of rubber goods may be thus made of any size, whether hollow or solid, such as toys or panels in imitation of wood-carving, the molded structure being applied in the form of a veneer upon a backing or filling of any suitable material, the form, dimensions, and details of arrangement of the apparatus being varied to suit requirements.

I claim—

The method of molding sheet-caoutchouc, which consists essentially in pressing the sheet of unvulcanized caoutchouc into the form desired by the combined action of a vacuum at the one face of the sheet, and of a pressure other than that incident to the formation of a vacuum-pressure upon the other face of the sheet, maintaining the caoutchouc during the molding operation in a heated condition sufficient to increase its plasticity but insufficient to vulcanize it, whereby the pieces are capable of being cemented or otherwise united after they are molded and finally in vulcanizing the molded pieces, substantially as hereinbefore described.

The foregoing specification of my improvements in tin apparatus for the manufacture of india-rubber goods signed by me this 5th day of May, 1900.

HENRI HAMET.

Witnesses:
EDWARD P. MACLEAN,
MAURICE H. PIGNET.